Patented Apr. 10, 1923.

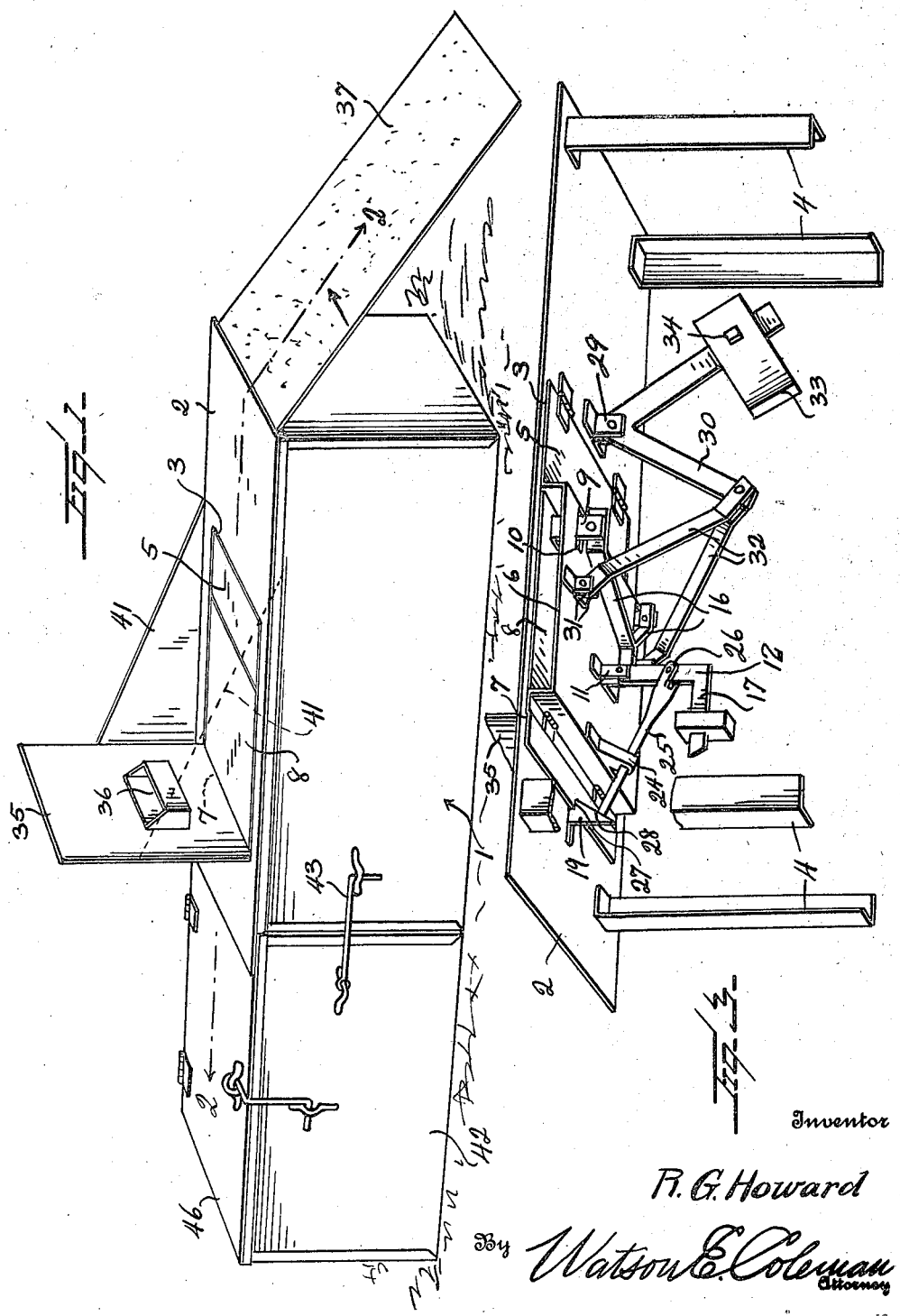

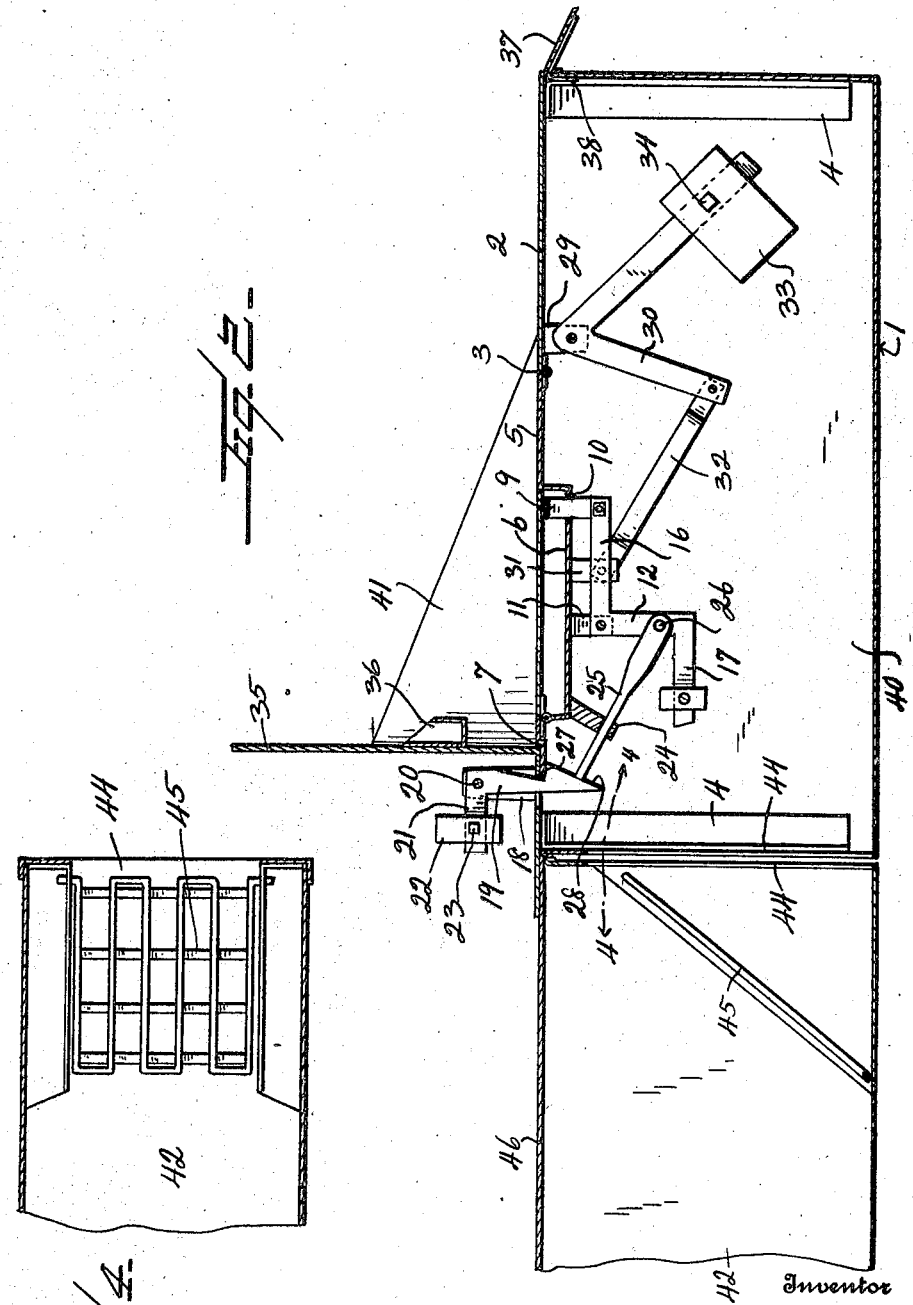

1,451,223

UNITED STATES PATENT OFFICE.

ROWLAND G. HOWARD, OF JACKSON, TENNESSEE.

ANIMAL TRAP.

Application filed January 8, 1921. Serial No. 435,925.

*To all whom it may concern:*

Be it known that I, ROWLAND G. HOWARD, a citizen of the United States, residing at Jackson, in the county of Madison and State of Tennessee, have invented certain new and useful Improvements in Animal Traps, of which the following is a specification, reference being had to the accompanying drawings.

The purpose of the present invention is to provide a device of this character, which is simple, efficient and practical in construction, capable of being manufactured for a relatively low cost and sold at a reasonable profit.

As a further purpose it is the aim to provide a trap adapted for trapping any specie of animal, particularly rats and the like.

Still another purpose is to provide a rat trap including an animal actuated trap member, adapted to tilt downwardly under the weight of the animal, permitting the animal to drop into the housing of the trap, it being possible to remove the animal subsequently.

A further purpose is to provide an animal trap, wherein an animal actuated trip is afforded for releasing the trap door of the trap, permitting the trap door to fall or open under the weight of the animal, causing the animal to fall into the compartment below the door.

A still further purpose consists in the provision of a trap door nicely balanced through the medium of gravity members, whereby the least possible weight of the animal will cause the door to swing downwardly suddenly and very quickly, there being a nicely balanced animal actuated trip to release the door, so that as soon as the weight of the animal is applied, the trip will operate, and since the front feet of the animal first contact with the trip, the legs of the animal slide, or spraddle forward, while the rear feet are still in contact with another part of the door of the frame, thereby starting the animal down the incline, caused by the door swinging downwardly, before the animal reaches the bait, which is placed in advance of the door.

The invention further aims to provide a trap, wherein a gravity member, counter balance latch or catch is included, so that no sooner than the animal actuated trip is moved, the latch or catch will be released, allowing the door to swing downwardly.

Also it is the purpose to provide means to steer or guide the animal upwardly toward the trap, thereby tending to cause the animal to proceed toward the bait in the front, instead of toward the sides.

An additional purpose resides in the provision of a trap of this character comprising a casing with the trap mechanism mounted therein and capable of being removed at any time, whereby the gravity counterbalanced members may be adjusted correspondingly to the trip, as well as to the trap door, the counterbalancing gravity member of the latch or catch being likewise adjustable, whereby the smallest amount of pressure or weight of the animal upon the trip, will release the latch, and permit of downward movement of the door for trapping the animal.

Furthermore it is the aim to provide a trap comprising a frame for the support of the trap mechanism, with a detachable receptacle or boxing or housing, into which the animal may enter after being trapped into the trap compartment, so that by detaching the housing or boxing, the animal may be subsequently removed. This receptacle or housing for the reception of the animal after being trapped may be of any suitable proportions, size and dimension, suitable to reduce the cost of production. All joints or attached parts may be connected in any suitable manner, preferably by spot welding or the like, in order to reduce the cost of production, hence permitting the trap being sold for a reasonable sum, within reach of everyone who needs a trap.

It is also the aim to provide a frame carrying the trap mechanism, so that the frame may be easily removed from the housing to permit the gravity members to be adjusted to a nicety, whereby the animal actuated trap door may operate under the least possible weight. After the mechanism has been adjusted, it may be replaced in the housing for operation.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a perspective view of the animal trap constructed in accordance with the invention.

Figure 2 is a longitudinal sectional view through the trap on line 2—2 of Figure 1.

Figure 3 is a detail perspective view of the frame and trap mechanism removed from the trap housing.

Figure 4 is a detail plan view of one end of the animal receiving boxing or housing, showing the swinging door, which automatically closes after the animal passes from the trap mechanism housing into the boxing.

Referring to the drawings, 1 designates a trap mechanism receiving housing, which may be any suitable length, width and height, and constructed of any suitable material, preferably sheet metal, though it may be made of wood, or very heavy sheet metal, so that a trap may be constructed for larger animals.

Mounted in the housing is a frame 2, which supports the trap mechanism proper. This frame 2 comprises a substantial top piece, preferably constructed of heavy gauged sheet metal having an opening 3, for the reception of the trap door. Depending from the corners of the top piece are substantial legs 4 of angle iron, capable of supporting the frame or top piece, when removed from the housing 1. It is obvious that when the frame is supported in the housing 1, the top piece engages and rests upon the edge of the side of the upper edge of the housing, with the legs out of contact with the bottom of the housing 1.

Suitably hinged to one end of the opening 3 in the top piece is a trap door 5. This door is provided with a depression 6, and may be constructed of any suitable material preferably heavy gauge sheet metal. The free end of the door 5 has a rabbet 7 to receive the edge of the opening, at a remote distance from the hinged end of the door, whereby the door when in its normal position, is flush with the upper surface of the top piece. In this way the door is designed to fit neatly within the opening 3, so that in so far as general appearance is concerned, it will be more or less impossible to observe the fact of the door being mounted in the opening.

Hinged in any suitable manner to one end of the wall of the depression 6 is an animal actuated trip 8. This trip 8 adjacent its opposite sides or edges is provided with downwardly extending lugs 9, which pass through the slots 10 of the bottom of the depression. These lugs may be fastened to the trip in any manner whatever, preferably by spot welding or the like. Pivotally mounted between a pair of spaced ears 11, which depend from the bottom of the depression is a lever 12. The ears 11 may be connected to the bottom of the depression in any way, simply to cheapen the cost of production, preferably by spot welding. The lever 12 has a pair of diverging arms 16 extending from the pivoted part of the lever. The lever also has a downwardly and laterally extending arm 17. The diverging arms 16 have their ends pivotally connected to the lugs 9, so that when the trip 8 is depressed, the lever 12 will lock. Carried by the top piece adjacent one end of the opening 3 is a pair of upwardly extending ear projections 18, which may be connected to the top piece in any way preferably by spot welding or the like. A latch or catch 19 is pivotally mounted at 20 between the ears 18 and one arm 21 thereof carries a gravity member or weight 22, which is held in different adjusted positions on the lateral arm 21 of the latch or catch by means of a set screw or the like 23. By adjusting the weight toward and from the pivot of the latch, it is possible to regulate the action of the latch. In other words by means of the weight, the latch may be made to operate slowly, or very quickly.

Carried by the underface of the depression is a guide 24, which receives a latch releasing member or plunger 25, which is pivotally connected at 26 to the lever 12. The latch or hook has a shoulder 27, which is engaged by the edge portion of the trap door, so as to support the door in an elevated position. The latch also has a beveled edge 28, to permit the end of the releasing member 25 to cam or slide in engagement with the shoulder. Pivotally mounted on a pair of lugs 29, which project downwardly from the top piece near one end, is an angle lever 30. Projecting from the bottom of the depression 6 are pairs of oppositely arranged ears 31, between which and one arm of the lever 30 a pair of links 32 are connected. Adjustably supported on one arm of the angle lever 30 is a weight 33, there being a set screw 34 for holding the weight in different adjusted positions. Under the action of the weight, the trap door 5 is lifted or returned to its normal position, for trapping the animal.

The frame is arranged in the housing 1, with the top piece resting upon the upper edge of the housing, so as to keep the legs from contacting with the floor or bottom of the housing. However, the frame or trap door may be removed from the housing, the legs will act to support the frame, while the different gravity members or weights are adjustable as may be found necessary.

In constructing the opening in the top piece, the metal cut from the opening may be turned upward from the edge of the opening opposite the hinge of the trap door, thereby acting as a support 35 for a bait receptacle 36.

An inclined walk 37 is connected to the housing 1 by the lugs 38, the upper surface of the walk is roughed or graveled, so as to keep the animal from slipping, in passing up upon the trap.

As soon as the animal reaches the door, and applies weight upon the trip 8, the trip will move downwardly, and thereby oscillate the lever 12, which in turn will operate the latch releasing member 25. This latch releasing member is more or less in alignment with the beveled edge of the latch, so that the least possible movement of the latch releasing member will impart movement to the latch, which draws the shoulder from the path of the free edge of the door, allowing the door to descend, and causing the animal to drop into the compartment 40 of the housing. It will be noted that when the front feet of the animal contact with the trip, and as soon as the trap door starts to incline downward, the animal's front legs are spraddled forwardly in a direction from the rear legs, causing the animal to slide into the compartment of the housing. The fact that the front legs spraddle forward, relieves the animal of chances of taking a better grip on the trap door with the hind legs, hence the chances of the animal escaping the trap door opening are nil. As soon as the animal slides off the trap door into the compartment of the housing 1, the trap door automatically returns to its initial position due to the gravity member on one end of the angle lever 30. The gravity member or weight on the lateral arm of the lever 12, returns the trap to its initial position, at the same time the trap door has returned to its normal position. In setting the trap, the bait is placed in the bait receiving receptacle, at a point adjacent one end of the trap door opening, so as to attract the animal thereto. Rising upwardly from the opposite edges of the top piece of the frame and connected to the wall or support for the receptacle, are pieces, screens, or other wire fabric 41, in order to keep the animal from reaching the bait from the side of the trap.

By this construction the animal will be guided or steered toward the bait, but unfortunately, due to the trap door mechanism and the release being in the path, the animal never reaches the bait, and due to the animal's weight the door opens, and the animal drops into the receptacle 1.

A boxing or housing 42 is latched or otherwise hooked at 43 to one end of the housing 1. The adjacent ends of the boxing 42 and the housing 1 have openings 44, so that the animal may pass from the housing 1 to the boxing 42. A gravity return door 45 is pivotally mounted in the boxing 42, in an inclined position adjacent the door and in the passage from the housing 1 to the boxing 42. This door may consist of bars, extending longitudinally and transversely, or may have a wire mesh work or fabric. When the animal drops into the receptacle 1, he will then direct his attention to the gravity closed screen door, passing under it and thereby be incaged in the boxing 42. The boxing 42 has a closure 46 which is hingedly mounted, there being a latch or the like for holding the closure securely. After the animal passes into the boxing 42, the boxing may be detached, and the animal removed in any manner whatsoever, and in case the animal is not desirable the animal may be destroyed. It will be noted that the shoulder 27 engages under the free unattached end of the trap door, to hold the free unattached end thereof against the under face of the top of the frame 2, to support the trap door in its raised initial position. Furthermore the gravity actuated means on one arm of the lever 12 acts to restore the trip 8 to its initial position, when pressure is relieved thereon before the trap door returns to its initial position, therefore the latch releasing plunger or member 25 is returned to its normal position for a substantial period of time before the trap door returns to its initial position and it will be noted that the arrangement and construction of the plunger or latch releasing member 25 to the inclined edge 28 are such as to prevent the inclined edge 28 of the latch from interfering with the restoration of the trip to its initial position.

The invention having been set forth, what is claimed as being useful is:

In an animal trap, a housing including a top piece provided with an opening therein, an animal guide extending the full length of said opening, an end wall at one end of the guide, a trap door hingedly mounted at the end of the opening opposite said end wall and having its free unattached end engaging under the top piece at a point beyond the end wall, a gravity actuated latch mounted on and operatively depending through the top piece beyond the end wall for limited movement, and having a shoulder engaging the underlapping part of the trap door to support it closed, gravity means to restore the trap door to its initial position, said trap door having a depression therein equal in width to the animal guide, an animal operated trip hingedly mounted at one end in the depression and adjacent the end wall, a gravity actuated bell crank member pivotally supported on the under face of the depression and operatively connecting with the trip, a latch releasing plunger operatively guided on the under part of the depression and connecting with the bell crank lever, the latch having a cam edge against which the trap door engages to restore it in engagement with the shoulder of the latch, and means to prevent hindering the restoration of the trip when pressure is relieved, when the trap door returns to its initial latched position.

In testimony whereof I hereunto affix my signature.

ROWLAND G. HOWARD.